US011787466B2

(12) United States Patent
Kim et al.

(10) Patent No.: US 11,787,466 B2
(45) Date of Patent: Oct. 17, 2023

(54) VEHICLE AND METHOD OF CONTROLLING TURNING THEREOF

(71) Applicants: HYUNDAI MOTOR COMPANY, Seoul (KR); KIA MOTORS CORPORATION, Seoul (KR)

(72) Inventors: Sang Joon Kim, Seoul (KR); Young Eun Kim, Uiwang-si (KR); Hui Un Son, Suwon-si (KR); Jea Mun Lee, Seoul (KR); Sung Hoon Yu, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 16/951,839

(22) Filed: Nov. 18, 2020

(65) Prior Publication Data

US 2021/0394823 A1 Dec. 23, 2021

(30) Foreign Application Priority Data

Jun. 18, 2020 (KR) .................. 10-2020-0074102

(51) Int. Cl.
*B62D 6/00* (2006.01)
*B62D 5/04* (2006.01)
(Continued)

(52) U.S. Cl.
CPC ............. *B62D 6/00* (2013.01); *B60W 30/045* (2013.01); *B60W 30/18172* (2013.01);
(Continued)

(58) Field of Classification Search
CPC .................. B62D 6/00; B62D 5/0463; B60W 2050/0031; B60W 2050/0055;
(Continued)

(56) References Cited

U.S. PATENT DOCUMENTS 6,984,003 B2 * 1/2006 Kogure .................. B60T 8/172
701/72
8,682,556 B2 * 3/2014 Handa .................. B60W 10/06
701/69
(Continued)

FOREIGN PATENT DOCUMENTS

CN 106800019 A * 6/2017 ............ B60W 10/08
CN 106809207 A * 6/2017 ............ B60W 10/08
(Continued)

OTHER PUBLICATIONS

CN-112896299-A translation (Year: 2021).*
(Continued)

*Primary Examiner* — Jeff A Burke
*Assistant Examiner* — Kyle T Johnson
(74) *Attorney, Agent, or Firm* — Slater Matsil, LLP

(57) ABSTRACT

A vehicle and a method of controlling turning thereof are provided. The turning control method of a vehicle includes calculating first compensation torque based on a lateral acceleration variation during turning, determining first compensated demanded torque by applying the first compensation torque to demanded torque, determining second compensation torque for preventing wheel slip of a driving wheel based on the first compensated demanded torque and an actual vehicle behavior, and determining second compensated demanded torque input to a driving source controller by applying the second compensation torque to the first compensated demanded torque.

20 Claims, 8 Drawing Sheets

(51) Int. Cl.
*B60W 30/045* (2012.01)
*B60W 30/18* (2012.01)
*B60W 50/00* (2006.01)

(52) U.S. Cl.
CPC ... *B62D 5/0463* (2013.01); *B60W 2050/0031* (2013.01); *B60W 2520/125* (2013.01); *B60W 2720/30* (2013.01); *B60Y 2300/045* (2013.01); *B60Y 2300/18175* (2013.01)

(58) Field of Classification Search
CPC ....... B60W 2520/125; B60W 2520/28; B60W 2552/15; B60W 2720/30; B60W 2720/406; B60W 50/00; B60W 30/045; B60W 30/18072; B60W 30/18172; B60W 40/076; B60W 40/109; B60W 2050/0022; B60W 2050/0052; B60W 2520/26; B60W 2720/26; B60Y 2300/045; B60Y 2300/18066; B60Y 2300/18175

See application file for complete search history.

(56) References Cited

U.S. PATENT DOCUMENTS

| | | | | |
|---|---|---|---|---|
| 8,825,335 | B2* | 9/2014 | Rylander | B60W 40/114 701/82 |
| 2004/0162663 | A1* | 8/2004 | Kogure | B60G 17/0195 701/72 |
| 2012/0053806 | A1* | 3/2012 | Tronnberg | B60W 30/18145 701/70 |
| 2013/0261894 | A1* | 10/2013 | Kojima | B62D 6/00 701/41 |
| 2014/0343790 | A1* | 11/2014 | Hestermeyer | B62D 6/04 701/41 |
| 2015/0203117 | A1* | 7/2015 | Kelly | F16H 61/0213 701/91 |
| 2016/0264148 | A1* | 9/2016 | Liu | B60W 40/06 |
| 2017/0247048 | A1* | 8/2017 | Namikawa | B62D 6/006 |
| 2018/0362021 | A1* | 12/2018 | Imamura | B60W 30/18172 |
| 2020/0391740 | A1* | 12/2020 | Magolan | B60W 20/13 |
| 2021/0031750 | A1* | 2/2021 | Oh | B60K 28/16 |
| 2021/0171015 | A1* | 6/2021 | Artail | B60K 6/445 |
| 2021/0171017 | A1* | 6/2021 | Oh | B60W 10/18 |

FOREIGN PATENT DOCUMENTS

| | | | | |
|---|---|---|---|---|
| CN | 110435628 A | * | 11/2019 | ............ B60W 10/06 |
| CN | 112896299 A | * | 6/2021 | ............ B62D 5/0463 |
| JP | 2010061330 A | * | 3/2010 | ............ B60W 40/09 |

OTHER PUBLICATIONS

CN-106809207-A translation (Year: 2017).*
CN-110435628-A translation (Year: 2019).*
CN-106800019-A translation (Year: 2017).*
JP-2010061330-A Translation (Year: 2010).*

* cited by examiner

VEHICLE AND METHOD OF CONTROLLING TURNING THEREOF

CROSS-REFERENCE TO RELATED APPLICATION

The present application claims priority to and the benefit of Korean Patent Application No. 10-2020-0074102, filed on Jun. 18, 2020, which is hereby incorporated by reference as if fully set forth herein.

TECHNICAL FIELD

The present disclosure relates to a vehicle and a method of controlling turning thereof.

BACKGROUND

A vehicle has different behavior characteristics depending on the position of a driving wheel. For example, in general, in the case of a front-wheel-drive vehicle, an understeer tendency, in which a turning angle is smaller than a steering angle and a vehicle is pushed outside a corner, occurs, and in the case of a rear-wheel-drive vehicle, an oversteer tendency, in which the turning angle is larger than the steering angle and the vehicle enters the inside of the corner, occurs.

SUMMARY

Accordingly, the present disclosure is directed to a vehicle having improved steering characteristics and stability during turning and a method of controlling turning thereof.

In particular, the present disclosure provides a vehicle for flexibly responding to a change in driving environment and a method of controlling turning thereof.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a turning control method of a vehicle includes calculating first compensation torque based on a lateral acceleration variation during turning, calculating first compensated demanded torque by applying the first compensation torque to demanded torque, calculating second compensation torque for preventing wheel slip of a driving wheel based on the first compensated demanded torque and an actual vehicle behavior, and calculating second compensated demanded torque input to a driving source controller by applying the second compensation torque to the first compensated demanded torque.

In another aspect of the present disclosure, a vehicle includes a driving source configured to supply driving force to a driving wheel, a driving source controller configured to control the driving source, and a turning control apparatus configured to control turning during turning, wherein the turning control apparatus includes a first compensator configured to calculate first compensation torque based on a lateral acceleration variation during turning, and a second compensator configured to calculate second compensation torque for preventing wheel slip of a driving wheel based on first compensated demanded torque obtained by applying the first compensation torque to demanded torque and an actual vehicle behavior, and the driving source controller controls the driving source based on second compensated demanded torque obtained by applying the second compensation torque to the first compensated demanded torque.

DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
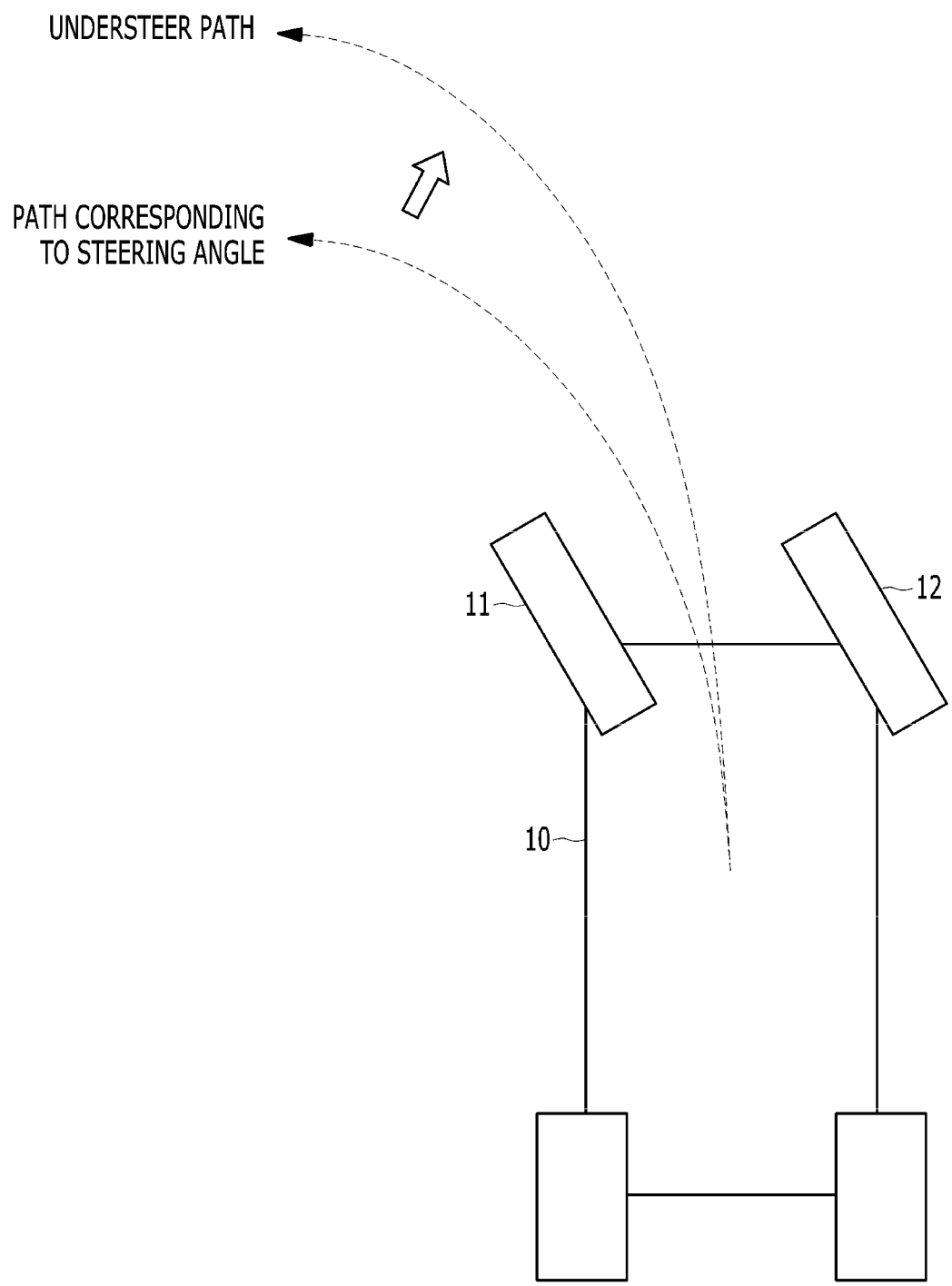
FIG. 1 shows understeer of a general front-wheel-drive vehicle.

Hereinafter, the embodiments of the present disclosure will be described in detail with reference to the accompanying drawings so as to be easily implemented by those skilled in the art. However, the present disclosure may be variously implemented, and is not limited to the embodiments described herein. In the drawings, in order to clearly describe the present disclosure, portions which are not related to the description of the present disclosure will be omitted, and similar portions are denoted by similar reference numerals throughout the specification.

Throughout the specification, when a certain portion is said to "include" a certain component, this does not indicate that other components are excluded, and the same may be further included unless specifically described to the contrary. The same reference numbers will be used throughout the drawings to refer to the same or like parts.

An embodiment of the present disclosure provides attitude control during turning using first compensation torque based on a lateral acceleration variation during turning and second compensation torque based on demanded torque to which the first compensation is applied and an actual vehicle behavior.

A vehicle to which the method of controlling turning according to the present embodiment is applied may include an electric motor having high responsiveness with respect to torque control compared with an internal combustion engine as a driving source, but needless to say, may also be applied to a general vehicle including an internal combustion engine.

FIG. 1 shows understeer of a general front-wheel-drive vehicle.

Referring to FIG. 1, when understeer occurs in a front-wheel-drive vehicle 10, the vehicle is pushed in an opposite direction to a turning direction instead of a path expected by a driver based on a steering angle. Accordingly, the driver needs to make an effort to more precisely control steering, and efforts to overcome the problem have been made in the interest of control. A representative example of such a steering/posture control method includes a torque vectoring method and a gravity (G)-vectoring method.

First, the torque vectoring method is a method of reducing understeer by checking wheel slip of an inner driving wheel 11 positioned inward in a turning direction during acceleration and turning, and applying braking force to generate relatively high torque from an outer driving wheel 12. The torque vectoring method is mainly applied to a critical situation, and thus when a braking degree of the inner driving wheel 11 increases, the method may cause a sense of unfamiliarity due to deceleration. Needless to say, a sense of deceleration of the inner driving wheel 11 may be reduced by compensating for torque increase of the outer driving wheel 12, but in a critical situation to which the control is applied, a driving source already generates high torque, and thus there is a problem in that it is difficult to reduce a sense of deceleration because clearance torque for compensation is not sufficient in the outer driving wheel 12.

The G-vectoring method is technology for improving the responsiveness and the stability for turning using weight transfer as the center of gravity changes when a vehicle accelerates and decelerates. In detail, the present method generally improves grip force of a tire and improves cornering force by reducing torque of a driving source when the vehicle starts turning based on a change in lateral acceleration and restores torque when turning is terminated, thereby improving responsiveness for turning.

The G-vectoring method is similar to the torque vectoring method in the interest of reduction of understeer, but the possibility that the G-vectoring method is applied in reality such as a highway ramp is high compared with the torque vectoring method. However, the method has a problem in that, because an adjusted amount of torque is determined based on variation in lateral acceleration, consistency of the control result is insufficient due to an effect changed depending on a situation such as road deviation.

Figure 2:
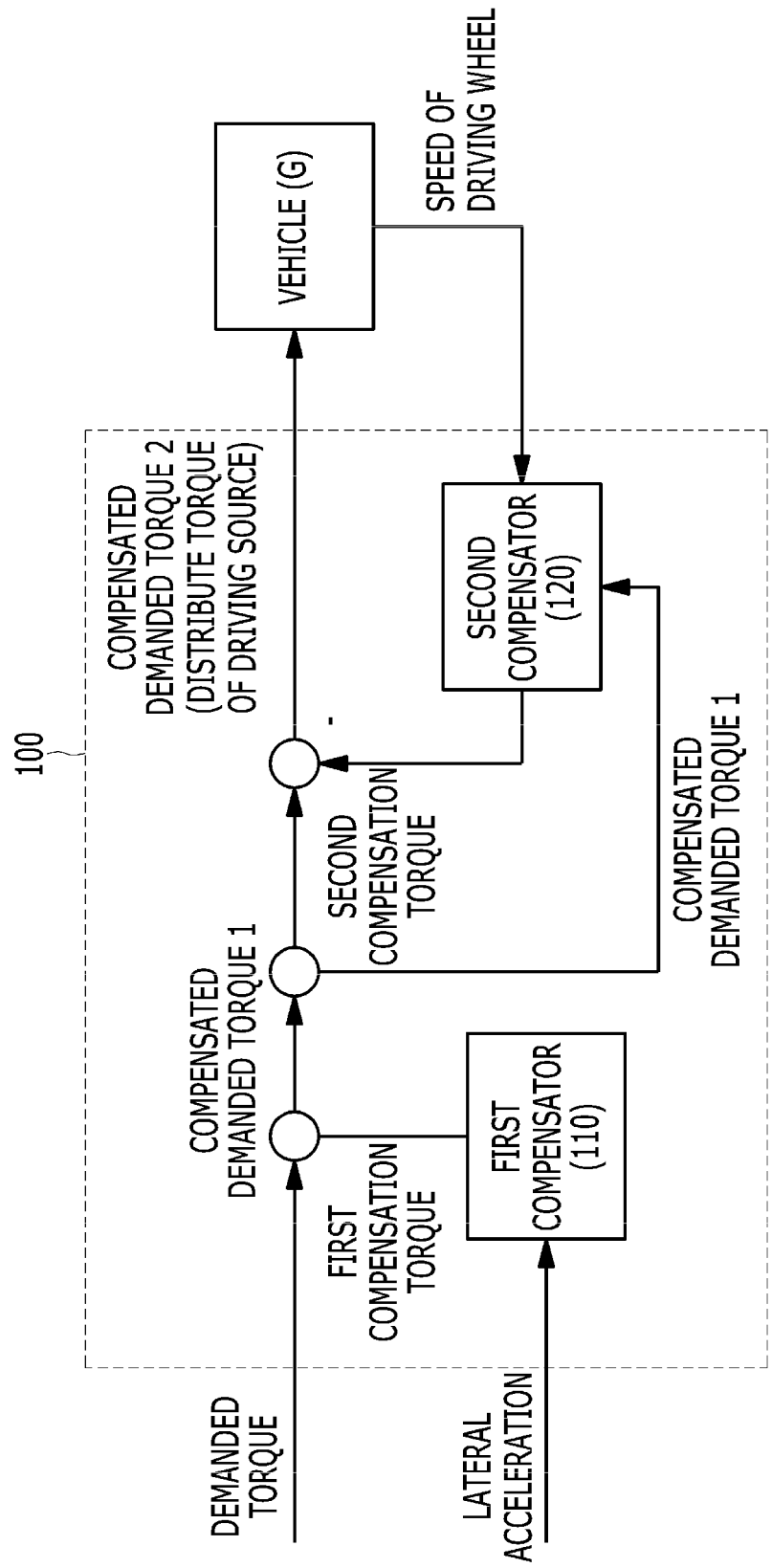
FIG. 2 is a diagram showing an example of the configuration of a turning control apparatus in one form of the present disclosure.

FIG. 2 is a diagram showing an example of the configuration of a turning control apparatus in some forms of the present disclosure.

Referring to FIG. 2, a turning control apparatus 100 applicable to embodiments may have information on demanded torque, lateral acceleration, and an actual vehicle behavior as input information and may have target torque to be generated from a driving source, that is, compensated demanded torque 2, as output information.

The turning control apparatus 100 may include a first compensator 110 for calculating first compensation torque based on variation in lateral acceleration, and a second compensator 120 for calculating second compensation torque based on the demanded torque (i.e., compensated demanded torque 1) to which the first compensation torque is applied and the actual vehicle behavior (e.g., driving-wheel speed).

In reality, the turning control apparatus 100 may be configured in the form of a separate controller that manages a turning control function or may be configured to perform one function of another general controller but the present disclosure is not limited thereto. For example, when the turning control apparatus 100 is configured to perform one function, the turning control apparatus 100 may be configured in the form of any one of controllers for controlling a driving source, for example, a hybrid control unit (HCU) of a hybrid vehicle (HEV), a vehicle control unit (VCU) of an electric vehicle (EV), an advanced driver assistance system (ADAS) controller, or an electronic stability control (ESC)/vehicle dynamic control (VDC) controller.

Hereinafter, a detailed operation of each component of the turning control apparatus 100 will be described.

First, the first compensator 110 may calculate the first compensation torque based on variation in lateral acceleration, which will be described with reference to FIG. 3.

Figure 3:
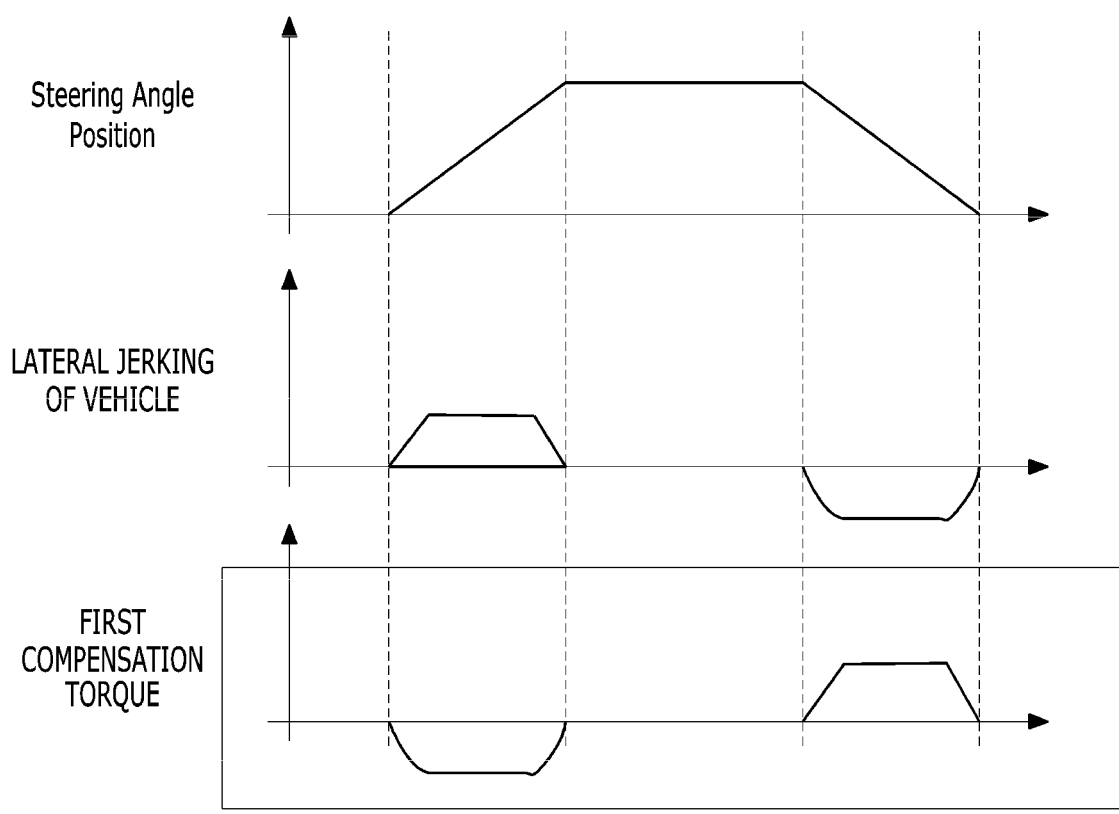
FIG. 3 is a diagram for explaining a concept of first compensation torque in one form of the present disclosure.

FIG. 3 is a diagram for explaining a concept of first compensation torque in some forms of the present disclosure. In FIG. 3, the horizontal axes commonly indicate a time and the vertical axes indicate a steering angle, lateral jerking of a vehicle, and first compensation torque from top to bottom.

Referring to FIG. 3, when a steering angle is changed by applying steering input, for example, when a driver manipulates a steering wheel for turning, lateral acceleration changes in the vehicle and lateral jerking occurs. The lateral jerking may be acquired by applying at least one method of differentiation or filtering based on a lateral acceleration sensor value, but this is merely exemplary and the present disclosure is not limited thereto.

The first compensator 110 may calculate first compensation torque for offsetting lateral jerking. For example, jerking as application of steering input begins when a vehicle enters a corner may offset the first compensation torque corresponding to braking, and jerking as steering input is released when the vehicle departs from the corner may offset the first compensation torque corresponding to acceleration. A detailed method of calculating the first compensation torque may be configured in the form of "first compensation torque=−lateral acceleration rate of change gain", which may be calculated in a similar way to the gravity (G)-vectoring method, and thus a detailed description thereof is omitted herein.

The first compensation torque output by the first compensator 110 may be applied to the demanded torque to achieve the compensated demanded torque 1. Here, the demanded torque may be acquired based on a manipulation amount of an accelerator pedal or a brake pedal and may be calculated based on a virtual pedal value output by a controller that manages a corresponding function in an autonomous driving or cruise control situation, and the present disclosure is not limited thereto.

Then, the second compensator 120 may detect wheel slip that occurs in a driving wheel of a vehicle when compensation torque is applied and may calculate and output second compensation torque for preventing/reducing the detected wheel slip. The configuration and function of the second compensator 120 will be described with reference to FIGS. 4 to 7.

Figure 4:
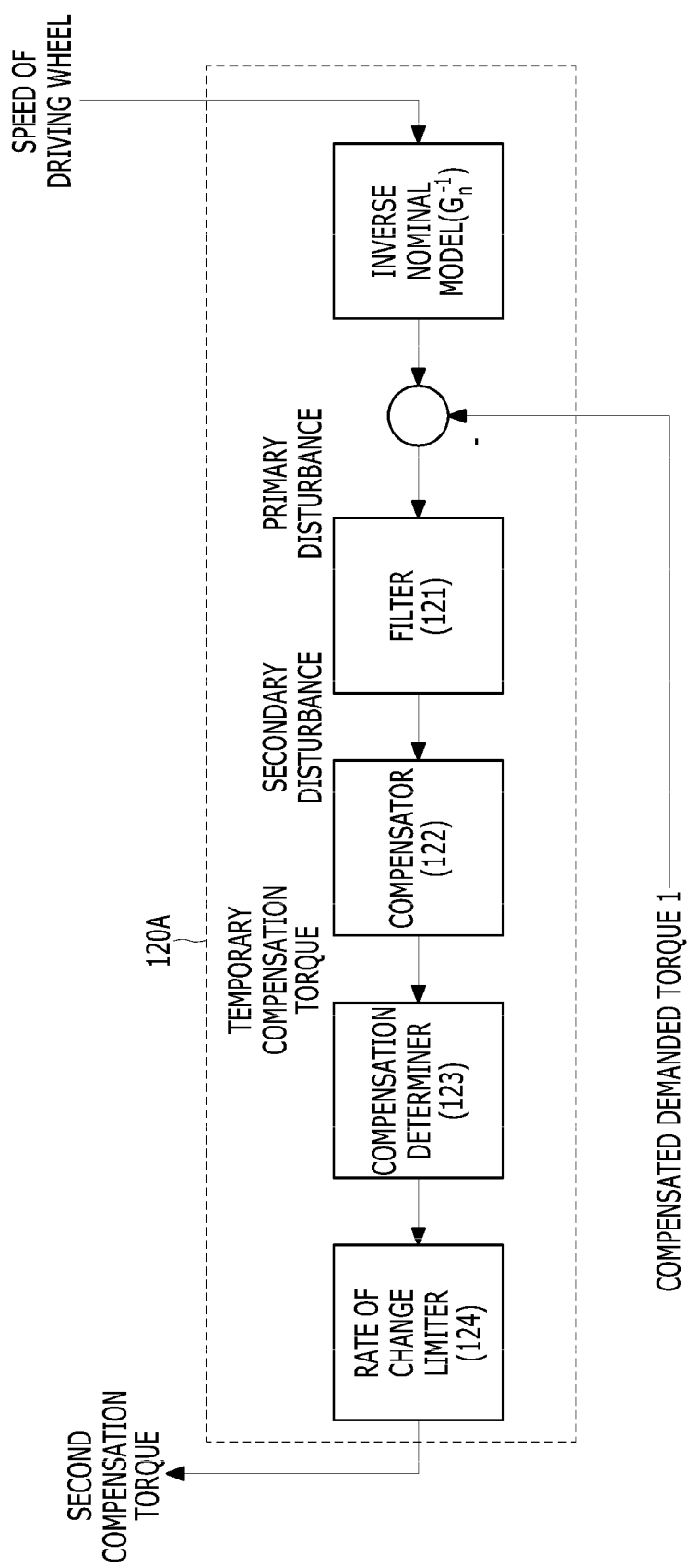
FIG. 4 is a diagram showing an example of the configuration of a second compensator in one form of the present disclosure.
Figure 5:
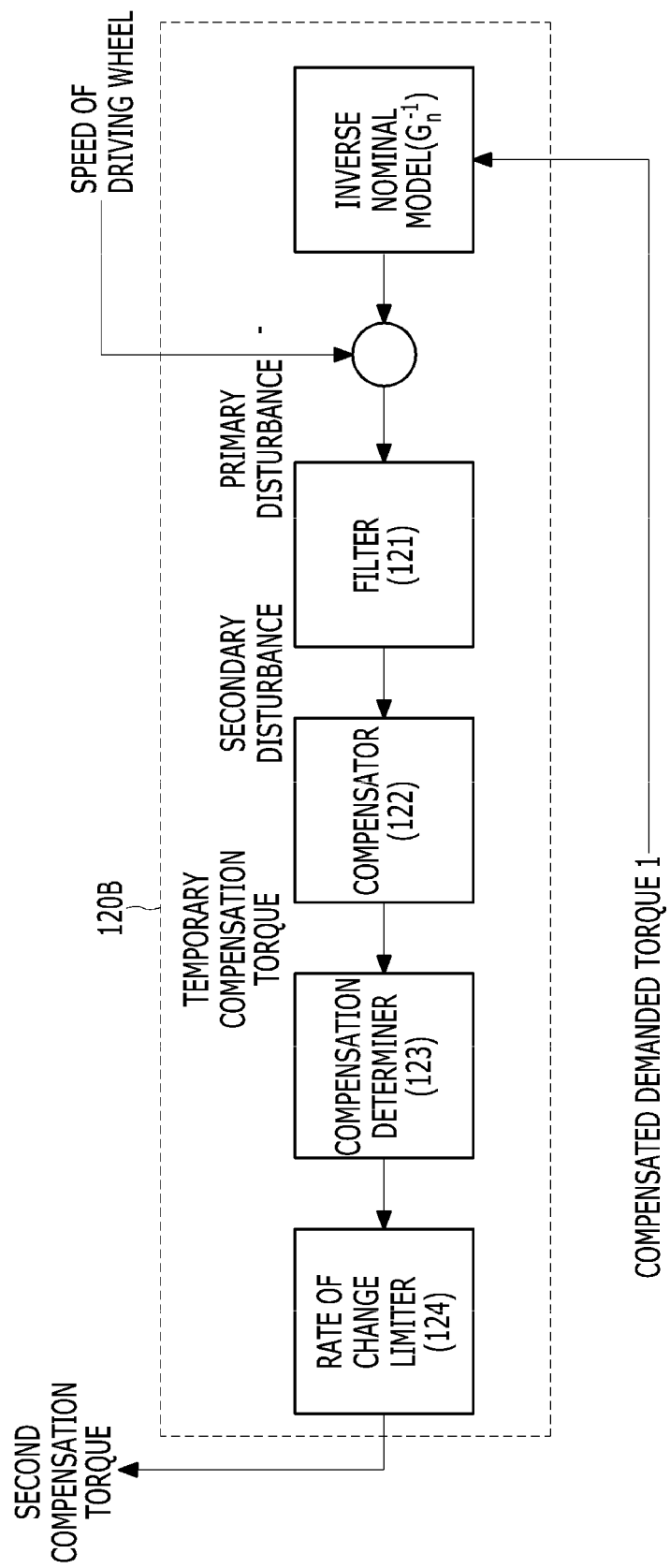
FIG. 5 is a diagram showing another example of the configuration of a second compensator in one form of the present disclosure.

FIG. 4 is a diagram showing an example of the configuration of a second compensator in some forms of the present disclosure. FIG. 5 is a diagram showing another example of the configuration of a second compensator in some forms of the present disclosure.

A second compensator 120A shown in FIG. 4 and a second compensator 120B shown in FIG. 5 may have the same type of input values and the same type of output values and may have the same configuration except for a method of calculating primary disturbance corresponding to wheel slip that occurs in a driving wheel when compensation torque is applied.

In detail, the second compensator 120A shown in FIG. may calculate demanded torque corresponding to an actual vehicle behavior by applying an actual vehicle behavior based on an input value (i.e., compensated demanded torque 2) to a controller for controlling a driving source to an inverse nominal model Gn−1 corresponding to the inverse of a nominal model Gn depending on a road condition, and may compare the demanded torque with the compensated demanded torque 1 to calculate the primary disturbance.

In contrast, the second compensator 120B shown in FIG. 5 may calculate a vehicle behavior expected at the compensated demanded torque 1 through the nominal model Gn and may compare the vehicle behavior with an actual vehicle behavior depending on the compensated demanded torque 2 to calculate the primary disturbance.

Here, the actual vehicle behavior may use driving-wheel speed detected by a wheel-speed sensor for measuring speed of each driving wheel, but this is merely exemplary and the present disclosure is not limited thereto. For example, according to another embodiment of the present disclosure, speed of another component connected to a driving shaft, for example, speed of an engine/motor or speed of an output shaft of a transmission may also be used instead of the driving-wheel speed.

Figure 6:
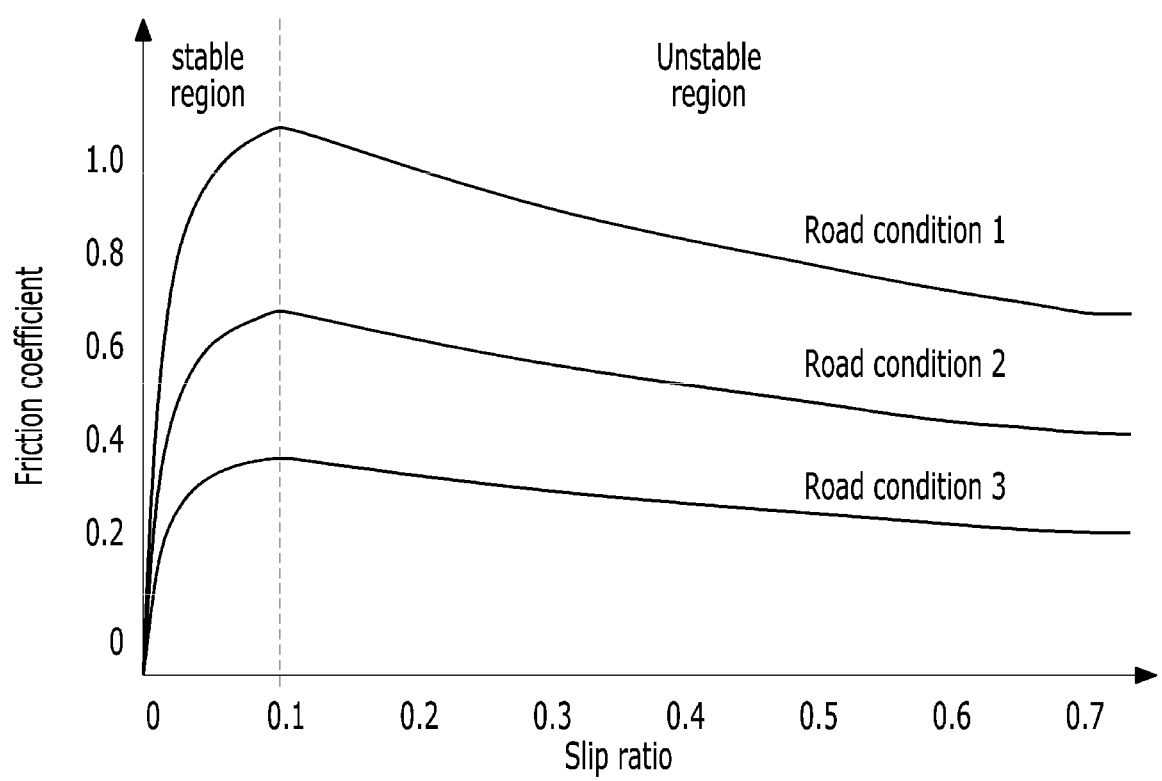
FIG. 6 is a diagram showing an example of the relationship of driving force depending on a slip ratio for selecting a nominal model in one form of the present disclosure.

As described above, the nominal model is a model that is a target of the vehicle behavior, and the second compensator 120 may compensate for a model error using the nominal mode or an inverse model thereof. The nominal model will be described with reference to FIG. 6. FIG. 6 is a diagram showing an example of the relationship of driving force and a slip ratio for selecting a nominal model in some forms of the present disclosure.

FIG. 6 shows the relationship between a slip ratio and a friction coefficient depending on a road condition. Although an absolute peak value of driving force is changed for each road condition, the maximum driving force may be maintained while basically staying in a stable region within a specific slip ratio (i.e., 0.1), but when the slip ratio increases, slip may further increase toward an unstable region. Inertia of a wheel and inertia of a vehicle will be summarized below with regard to a slip ratio.

First, a slip ratio A may be calculated using Equation 1 below.

$$\lambda(\text{slip ratio}) = \frac{R_{eff}\omega - v}{R_{eff}\omega}, R_{eff}\omega > v \quad [\text{Equation 1}]$$

In Equation 1 above, $R_{eff}$ is a dynamic radius of a tire, $\omega$ is wheel speed, and $v$ is vehicle speed.

Equivalent inertia $J_{eq}$ obtained by summing inertia $J_{whl}$ of a wheel and inertia of a vehicle may be calculated using Equation 2 below.

$$J_{eq} = J_{whl} + mR_{eff}^2(1-\lambda) \quad [\text{Equation 2}]$$

In Equation 2 above, m is the mass of a vehicle.

In the nominal model, an ideal state without wheel slip is assumed, and thus when the slip ratio $\lambda$ is 0, inertia $J_n$ of the nominal model may be calculated using Equation 3 below.

$$J_n = J_{whl} + mR_{eff}^2 \quad [\text{Equation 3}]$$

Lastly, the nominal model may be selected using Equation 4 below.

$$G_n(s) = \frac{1}{J_n s} \quad [\text{Equation 4}]$$

However, the aforementioned selection of the nominal model described through Equations 1 to 4 above is merely exemplary and the present disclosure is not limited thereto. According to another embodiment, inertia in the nominal model may also be selected based on data on acceleration in a situation of a high friction coefficient (high μ).

A filter 121 may output secondary disturbance by performing signal processing for extracting disturbance in the range of a specific frequency from the primary disturbance corresponding to an error between the model and the actual behavior. For example, when the filter 121 is used for the purpose of removing high-frequency noise depending on a frequency as an extraction target, a low pass filter (LPF) having a specific time constant may be applied, and when the filter 121 is used for detecting only high-frequency disturbance, a high pass filter (HPF) may be applied. When the filter 121 is used for detecting only disturbance within the range of a specific frequency, a band pass filter (BPF) or a combination of a BPF and an LPF may be applied.

Then, a compensator 122 may have, as an input value, the secondary disturbance output from the filter 121 and may have, as an output value, compensation torque for making the secondary disturbance be 0, that is, temporary compensation torque. In this case, the compensator 122 may also differentiate gain values to be applied to compensation using a road slope as an additional input value (e.g., rapid compensation by increasing a gain toward an uphill road). In reality, the compensator 122 may be configured in the form of proportional-integral-derivative (PID), but may be configured in any type as long as 0 is achieved by compensating for the secondary disturbance.

Then, a compensation determiner 123 may determine whether compensation is performed on disturbance detected by applying hysteresis to the temporary compensation torque output from the compensator 122, which will be described with reference to FIG. 7.

Figure 7:
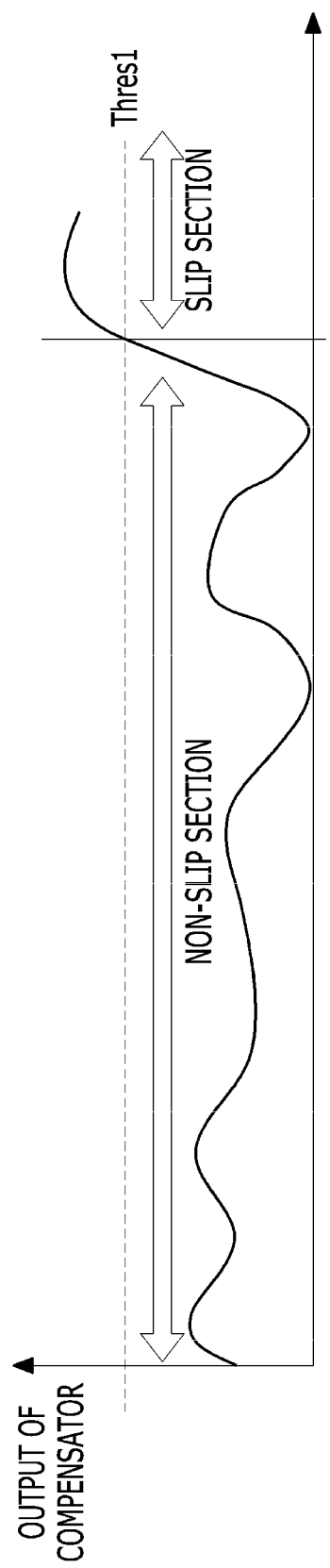
FIG. 7 is a diagram for explaining an operation of a compensation determiner in one form of the present disclosure.

FIG. 7 is a diagram for explaining an operation of a compensation determiner in some forms of the present disclosure.

Referring to FIG. 7, the compensation determiner 123 may apply a predetermined hysteresis value Thres1 to output of a compensator, may process a value less than the corresponding value as non-slip, and may process a value equal to or greater than the corresponding value as slip to determine whether to compensate for wheel slip. Here, the hysteresis value Thres1 may be determined as a greater value than a value that is an output value of a compensator, which is checked through an experimentation corresponding to a driving situation in which wheel slip generally does not occur, but the present disclosure is not limited thereto.

The compensation determiner 123 may set another hysteresis value Thres2 and, upon receiving an output value of the compensator, which is equal to or less than the corresponding value Thres2, the compensation determiner 123 may also determine to release compensation. In this case, the hysteresis value Thres2 that is a reference for releasing compensation may be set to a value (e.g., generally, a compensator output value equal to or less than 0) corresponding to the state in which output of the compensator is the smallest and there is no disturbance, but the present disclosure is not limited thereto.

When the compensation determiner 123 determines to compensate for wheel slip (that is, output of compensator>=Thres1), a rate of change limiter 124 may output second compensation torque corresponding to final output of the second compensator 120 by applying limitation of a rate of change to the temporary compensation torque determined by the compensator 122.

Here, the second compensation torque is an amount that is lastly subtracted from the compensated demanded torque in order to prevent wheel slip, and thus, in the following description, increase may refer to a rate of change of the subtracted amount, and decrease may refer to a rate of change for restoring the subtracted amount.

- Limitation when temporary compensation torque increases: Wheel slip needs to be rapidly controlled, and thus the rate of change may be set to a single value in consideration of the responsiveness of a driving source.
- Limitation when temporary compensation torque decreases: When the subtracted amount is quickly restored, shock based thereon may be caused. Thus, generally, the weights of front and rear wheels are balanced on flat land, but are unbalanced on an uphill road, and thus as a slope of the uphill road is increased, the rate of change may be set to be smaller. Needless to say, a rate of decrease may also be set to be changed for a gear stage.

Figure 8:
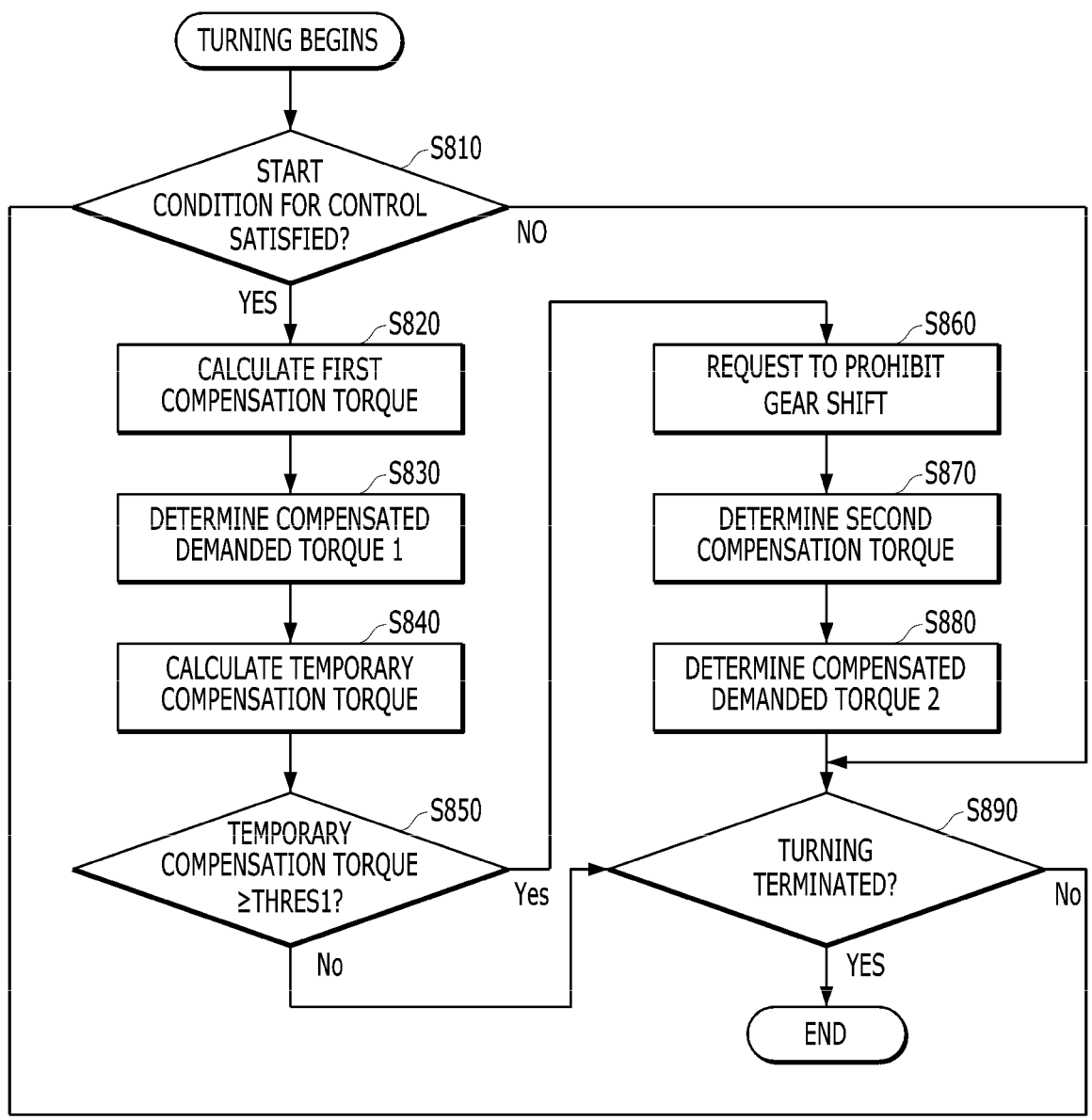
FIG. 8 is a flowchart showing an example of a turning control procedure in one form of the present disclosure.

A turning control procedure based on the aforementioned configuration of the turning control apparatus 100 is summarized in a flowchart of FIG. 8.

FIG. 8 is a flowchart showing an example of a turning control procedure in some forms of the present disclosure.

Referring to FIG. 8, as turning begins, the turning control apparatus may determine whether a start condition for starting control of turning is satisfied (S810).

The start condition may be determined according to whether to simultaneously satisfy at least one of a steering angle, lateral acceleration, vehicle speed, a critical situation, or whether a function interfering with control of turning is activated.

For example, the steering angle condition may be set according to "C1≤steering angle≤C2", C1 may be a value corresponding to low steering input from which turning does not begin, and C2 may be a value corresponding to relatively abrupt steering input seen to be steering according to driver intention.

The condition of lateral acceleration may be set according to "D1≤lateral acceleration≤D2", D1 may be lateral acceleration corresponding to C1, and D2 may be lateral acceleration corresponding to C2, but in contrast, D1 and D2 may also be set irrespective of a steering angle.

With regard to the condition of vehicle speed, the present control is insignificant in vehicle at which understeer barely occurs, and thus the vehicle speed may be set to prevent unnecessary control from beginning in such a way that the condition of vehicle speed is satisfied only in the range equal to or greater than the set vehicle speed.

The condition of the critical situation may be set in such a way that the present control does not begin in the critical situation. For example, when a manipulation amount of an accelerator pedal corresponding to a critical situation such as sudden acceleration or a manipulation amount of a brake pedal corresponding to a critical situation such as sudden deceleration is input, or when a function of an anti-lock braking system (ABS) or traction control system (TCS) function interferes, beginning of the present control may be limited.

In addition, a driving source and a wheel are temporarily disconnected during gear shift, and thus beginning of the present control may be limited.

When the start condition for starting control of turning is satisfied (YES of S810), the first compensator 110 may calculate first compensation torque as feed forward torque based on the lateral acceleration variation (S820).

The turning control apparatus 100 may determine compensated demanded torque 1 by applying the first compensation torque to demanded torque (S830).

The second compensator 120 may calculate the temporary compensation torque based on actual behavior of a vehicle and the compensated demanded torque 1 (S840). A detailed procedure of calculating the temporary compensation torque through the primary disturbance, the secondary disturbance, or the like by the second compensator 120 is the same as the description given with reference to FIGS. 4 to 6, and thus a repeated description thereof is omitted.

The compensation determiner 123 of the second compensator 120 may determine whether to perform compensation according to whether wheel slip occurs by applying hysteresis to the temporary compensation torque (S850). When compensation is determined according to wheel slip (i.e., temporary compensation torque≥Thres1, YES of S850), the turning control apparatus 100 may request a transmission controller for controlling a transmission (e.g., a transmission control unit (TCU)) to prohibit gear shift (S860) and may determine the second compensation torque by applying limitation of a rate of change to the temporary compensation torque (S870).

Accordingly, the turning control apparatus 100 may determine the compensated demanded torque 2 by applying the second compensation torque to the compensated demanded torque 1 (S880). As described above, the compensated demanded torque 2 may be transferred as an input value to a controller (e.g., a hybrid controller, an engine controller, or a motor controller) for controlling a driving source.

When the temporary compensation torque does not satisfy a hysteresis condition (NO of S850), only the first compensation torque without the second compensation torque may be applied to the demanded torque.

The aforementioned control procedure may be continuously/repeatedly performed until turning is terminated (S890).

The vehicle related to at least one embodiment of the present disclosure as configured above may provide excellent steering characteristics and stability during turning.

In particular, according to the present disclosure, the present disclosure provides a vehicle for flexibly responding to a change in driving environment by combining different compensation torques depending on a situation, thereby improving usability in reality.

It will be appreciated by persons skilled in the art that that the effects that could be achieved with the present disclosure are not limited to what has been particularly described hereinabove and other advantages of the present disclosure will be more clearly understood from the detailed description.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of controlling a vehicle, the method being performed by the vehicle during operation of the vehicle and comprising:
determining a demanded torque based on a manipulation amount of an accelerator pedal or a brake pedal of the vehicle, the demanded torque being determined in response to a driver manipulating a steering wheel for turning the vehicle;
determining a first compensation torque based on a lateral acceleration rate of change during turning, the lateral acceleration rate of change obtained by use of a lateral acceleration sensor;
determining a first compensated demanded torque by applying the first compensation torque to the demanded torque;
determining a second compensation torque for preventing wheel slip of a driving wheel based on the first compensated demanded torque and an actual vehicle behavior, the actual vehicle behavior including an actual speed of the driving wheel of the vehicle;
determining a second compensated demanded torque by applying the second compensation torque to the first compensated demanded torque; and
controlling a driving source of the vehicle based on the second compensated demanded torque while turning the vehicle.

2. The method of claim 1, wherein determining the second compensation torque comprises determining a primary disturbance corresponding to a difference between the actual vehicle behavior and an expected vehicle behavior that is expected at the first compensated demanded torque.

3. The method of claim 2, wherein determining the primary disturbance comprises determining the primary disturbance using a nominal model based on an equivalent inertia of wheel inertia and vehicle inertia or using an inverse nominal model that is an inverse model of the nominal model.

4. The method of claim 3, wherein determining the primary disturbance comprises comparing a value obtained by inputting driving-wheel speed to the inverse nominal model with the first compensated demanded torque.

5. The method of claim 3, wherein determining the primary disturbance comprises comparing a value obtained by inputting the first compensated demanded torque to the nominal model with driving-wheel speed.

6. The method of claim 2, wherein determining the second compensation torque further comprises:
determining a secondary disturbance by filtering the primary disturbance;
determining a temporary compensation torque for compensating for the secondary disturbance; and
determining whether to perform compensation according to wheel slip of the driving wheel by applying a predetermined hysteresis to the temporary compensation torque.

7. The method of claim 6, wherein determining the temporary compensation torque comprises applying an increasing gain as a slope increases.

8. The method of claim 6, wherein determining the second compensation torque further comprises:
determining to perform the compensation according to the wheel slip of the driving wheel; and
in response to determining to perform the compensation, determining the second compensation torque by applying limitation of a rate of change to the temporary compensation torque.

9. The method of claim 8, wherein determining the second compensation torque comprises:
applying limitation of different rates of change based on whether the temporary compensation torque increases or decreases; and
when the temporary compensation torque decreases, applying the limitation of different rates of change based on at least one of a slope or a gear stage.

10. A non-transitory computer-readable recording medium having a program recorded thereon, the program configured to execute the method of claim 1.

11. A vehicle comprising:
a plurality of wheels including a driving wheel;
an accelerator pedal;
a brake pedal;
a steering wheel configured to be manipulated to cause a turning of the vehicle;
a lateral acceleration sensor configured to obtain a lateral acceleration of the vehicle during the turning;
a driving source configured to supply a driving force to the driving wheel;
a driving source controller configured to control the driving source; and
a turning control apparatus configured to control the turning, wherein the turning control apparatus comprises:
a first compensator configured to determine a first compensation torque based on a demanded torque and a lateral acceleration rate of change during the turning, the demanded torque being based on a manipulation amount of the accelerator pedal or the brake pedal and the lateral acceleration rate of change obtained by use of the lateral acceleration sensor; and
a second compensator configured to determine a second compensation torque for preventing wheel slip of the driving wheel based on an actual vehicle behavior and a first compensated demanded torque that is obtained by applying the first compensation torque to the demanded torque, the actual vehicle behavior including an actual speed of the driving wheel;
wherein the driving source controller is configured to control the driving source based on a second compensated demanded torque that is obtained by applying the second compensation torque to the first compensated demanded torque so that the turning of the vehicle is effected by the second compensated demanded torque.

12. The vehicle of claim 11, wherein the second compensator is configured to determine a primary disturbance corresponding to a difference between the actual vehicle behavior and an expected vehicle behavior that is expected at the first compensated demanded torque.

13. The vehicle of claim 12, wherein the second compensator is configured to determine the primary disturbance using a nominal model based on an equivalent inertia of wheel inertia and vehicle inertia or using an inverse nominal model that is an inverse model of the nominal model.

14. The vehicle of claim 13, wherein the second compensator is configured to determine the primary disturbance by comparing a value obtained by inputting driving-wheel speed to the inverse nominal model with the first compensated demanded torque.

15. The vehicle of claim 13, wherein the second compensator is configured to determine the primary disturbance by comparing a value obtained by inputting the first compensated demanded torque to the nominal model with a driving-wheel speed.

16. The vehicle of claim 12, wherein the second compensator further comprises:
   a filter configured to output a secondary disturbance by filtering the primary disturbance;
   a compensator configured to determine a temporary compensation torque for compensating for the secondary disturbance; and
   a compensation determiner configured to determine whether to perform compensation according to wheel slip of the driving wheel by applying a predetermined hysteresis to the temporary compensation torque.

17. The vehicle of claim 16, wherein the compensator is configured to determine the temporary compensation torque by applying an increasing gain as a slope increases.

18. The vehicle of claim 16, wherein the second compensator further comprises a rate change limiter configured to output the second compensation torque by applying limitation of a rate of change to the temporary compensation torque when it is determined to perform the compensation according to the wheel slip of the driving wheel.

19. The vehicle of claim 18, wherein the rate change limiter is configured to:
   apply limitation of different rates of change based on whether the temporary compensation torque increases or decreases; and
   when the temporary compensation torque decreases, apply the limitation of the different rates of change based on at least one of a slope or a gear stage.

20. A vehicle comprising:
   a plurality of wheels including a driving wheel;
   an accelerator pedal;
   a brake pedal;
   a steering wheel;
   a driving source;
   a driving source controller;
   a lateral acceleration sensor;
   a processor;
   a non-transitory storage medium coupled to the processor, the storage medium storing instructions that, when executed by the processor, cause the processor to:
   determine a demanded torque based on a manipulation amount of the accelerator pedal or the brake pedal of the vehicle, the demanded torque being determined in response to a driver manipulating the steering wheel for turning the vehicle;
   determine a first compensation torque based on a lateral acceleration rate of change during turning, the lateral acceleration rate of change based on a lateral acceleration rate of the vehicle obtained by the lateral acceleration sensor during the turning;
   determine a first compensated demanded torque by applying the first compensation torque to the demanded torque;
   determine a second compensation torque for preventing wheel slip of the driving wheel based on the first compensated demanded torque and an actual vehicle behavior, the actual vehicle behavior including an actual speed of the driving wheel of the vehicle;
   determine a second compensated demanded torque by applying the second compensation torque to the first compensated demanded torque; and
   provide the second compensated demanded torque to the driving source controller so that the driving source controller controls the driving source based on the second compensated demanded torque while the vehicle is being turned.

* * * * *